US008977657B2

(12) United States Patent
Theis

(10) Patent No.: US 8,977,657 B2
(45) Date of Patent: Mar. 10, 2015

(54) FINDING LOST OBJECTS IN A FILE SYSTEM HAVING A NAMESPACE

(75) Inventor: Richard M. Theis, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 2794 days.

(21) Appl. No.: 11/191,405

(22) Filed: Jul. 28, 2005

(65) Prior Publication Data

US 2007/0027927 A1 Feb. 1, 2007

(51) Int. Cl.
G06F 12/00 (2006.01)
G06F 17/30 (2006.01)

(52) U.S. Cl.
CPC ............................... G06F 17/30067 (2013.01)
USPC ............................ 707/822; 709/202; 709/232

(58) Field of Classification Search
USPC ......................................................... 707/200
See application file for complete search history.

(56) References Cited

U.S. PATENT DOCUMENTS 5,504,883 A * 4/1996 Coverston et al. ............ 707/202
5,977,875 A * 11/1999 Lin et al. ....................... 340/570
6,049,799 A * 4/2000 Mangat et al. ................... 707/10
2002/0121975 A1* 9/2002 Struble et al. .................. 340/571
2003/0009484 A1* 1/2003 Hamanaka et al. ............ 707/200
2004/0107223 A1* 6/2004 Uno et al. ...................... 707/200
2004/0163029 A1* 8/2004 Foley et al. ..................... 714/769
2005/0010792 A1* 1/2005 Carpentier et al. ............ 713/193
2005/0038803 A1* 2/2005 Edwards ........................ 707/100
2005/0091214 A1* 4/2005 Probert et al. ..................... 707/9
2005/0097141 A1 5/2005 Loafman et al.

* cited by examiner

Primary Examiner — Dung K Chau
(74) Attorney, Agent, or Firm — Biggers Kennedy Lenart Spraggins, LLP

(57) ABSTRACT

Methods, apparatuses, and computer program products are provided for finding lost objects in a file system having a namespace that includes creating a list of all objects in the file system; identifying a portion of the namespace to compare with the list; comparing the portion of the namespace to the list; and deleting from the list entries for objects represented in the portion of the namespace. Some embodiments also include determining whether another portion of the namespace is available to compare with the list of all objects in the file system. Identifying a portion of the namespace to compare with the list according to embodiments for finding lost objects in a file system having a namespace may be carried out by identifying objects renamed during execution of the method.

15 Claims, 6 Drawing Sheets

FINDING LOST OBJECTS IN A FILE SYSTEM HAVING A NAMESPACE

BACKGROUND OF THE INVENTION

1. Field of the Invention

The field of the invention is data processing, or, more specifically, methods, apparatuses, and products for finding lost objects in a file system having a namespace.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computers have a foundation layer of software called an operating system that stores and organizes files and upon which applications depend for access to computer resources. In an operating system, the overall structure in which objects such as files are named, stored, and organized is called a file system. File systems are often organized in a namespace that consists of a collection of pathnames used to access the objects stored in the file system. These pathnames 'map' or 'link' an object into the namespace. A pathname is a sequence of symbols and names that identifies a file. Every file in the namespace has a name, called a filename, so the simplest type of pathname is just a filename. To access files in directories, a pathname identifies a path to the file starting from a working directory or from a root directory to the file. Various operating systems have different rules for specifying pathnames. In DOS systems, for example, the root directory is named '\', and each subdirectory is separated by an additional backslash. In UNIX, the root directory is named '/', and each subdirectory is followed by a slash. In Macintosh environments, directories are separated by a colon.

The operating system routinely links and unlinks objects in a file system as the objects are created and deleted. As objects are created, the operating system allocates physical space in the file system for an object and links the created object into the namespace for use by the operating system and various software applications. When an object is deleted, the operating system de-allocates the physical space for the object and unlinks the deleted object from the namespace because it is no longer in use.

Occasionally, objects in the file system unintentionally become unlinked from the namespace due to system crashes, data storage problems, hardware malfunctions, or software errors. These objects remain in the file system, but are no longer represented in the namespace. Objects that remain in the file system, but are no longer represented in the namespace and are not in use are called 'lost' objects. Lost objects present a problem for users because they are no longer in the namespace and therefore inaccessible by a user through a pathname. As such, unless found, lost objects may result in data being inaccessible to users despite the fact that the data exists in the file system.

Conventional operating systems typically contain limited software tools for recovering lost objects. For example, Microsoft Windows XP™ contains 'CHKDSK,' IBM's i5/OS™ utilizes 'RCLSTG,' and UNIX™ contains 'FSCK.' These file system repair tools however require the file system to operate in a restricted state that prevents applications and portions of the operating system from using the file system. Often these repair tools must keep the file system in a restricted state for many hours while the repairs take place. Such restrictions on file system use effectively shut down the computer system and therefore limit users access to other resources. The inability to access computer systems often increases business costs and reduces business revenues. Customers choosing not to repair the file system however risk loss or corruption of data.

In addition, some problems are pervasive in the sense that such problems continue to occur between operations of any file system repair tool. CHKDSK does not run continuously, for example. To the extent that CHKDSK locates lost file system object during a run, as soon as any particular run of CHKDSK is completed, file system objects continue to be lost and remain lost until the next time CHKDSK is run. The problem of losing file system objects is therefore seen to be 'pervasive,' and traditional file system repair tools do not provide comprehensive solutions to such problems.

SUMMARY OF THE INVENTION

Methods, apparatus, and computer program products are provided for finding lost objects in a file system that may be run pervasively, continuously in background, for example. The methods, apparatus, and products here disclosed typically may be implemented without interrupting normal operations of the file system—operating against or within a file system while the file system remains fully active. Methods, apparatus, and computer program products are provided for finding lost objects in a file system having a namespace that includes creating a list of all objects in the file system; identifying a portion of the namespace to compare with the list; comparing the portion of the namespace to the list; and deleting from the list entries for objects represented in the portion of the namespace. Some embodiments also include determining whether another portion of the namespace is available to compare with the list of all objects in the file system.

Identifying a portion of the namespace to compare with the list according to embodiments for finding lost objects in a file system having a namespace may be carried out by identifying the root of the namespace. Identifying a portion of the namespace to compare with the list also includes identifying objects renamed during execution of the method.

Finding lost objects in a file system having a namespace further includes identifying deleted objects during execution of the method and deleting the identified deleted objects from the list. Finding lost objects in a file system having a namespace may also be carried out by identifying objects unlinked while in use during execution of the method and deleting the identified objects unlinked while in use from the list.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
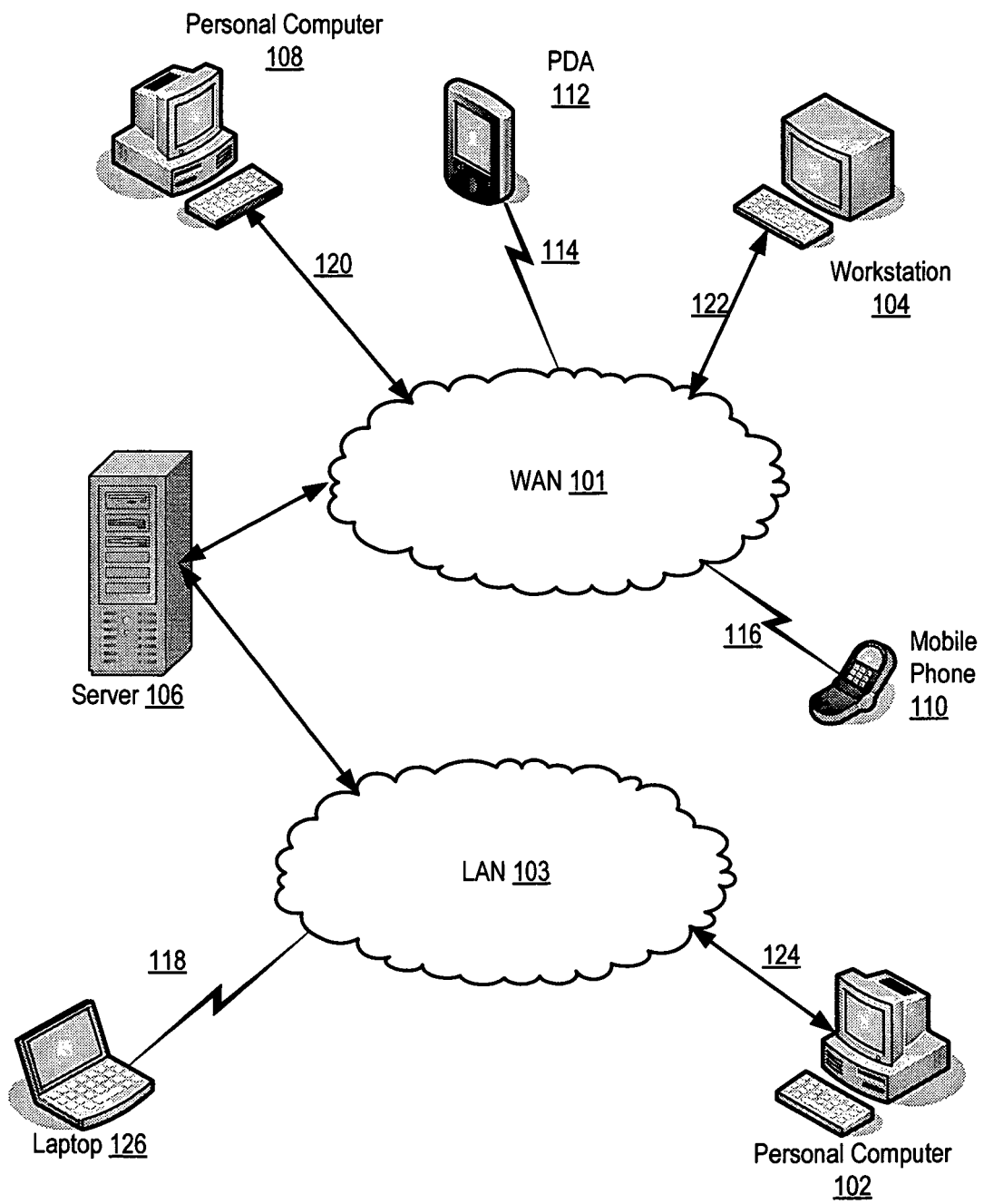
FIG. 1 sets forth a network diagram illustrating an exemplary system of computers each of which may have installed upon it a lost object search module capable of finding lost objects in a file system having a namespace according to embodiments of the present invention.

Exemplary methods, apparatuses, and products for finding lost objects in a file system having a namespace according to embodiments of the present invention are described with reference to the accompanying drawings, beginning with FIG. 1. FIG. 1 sets forth a network diagram illustrating an exemplary system for finding lost objects in a file system having a namespace according to embodiments of the present invention. The system of FIG. 1 operates generally to find lost objects in a file system having a namespace according to embodiments of the present invention by creating a list of all objects in the file system and iteratively carrying out the steps of identifying a portion of the namespace to compare with the list, comparing the portion of the namespace to the list, and deleting from the list all entries having names in the portion of the namespace.

The system of FIG. 1 includes a wide area network ("WAN") (101) and a local area network ("LAN") (103). The network connection aspect of the architecture of FIG. 1 is only for explanation, not for limitation. In fact, systems for finding lost objects in a file system having a namespace may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between a LAN (103) and a WAN (101). In the example of FIG. 1, several exemplary devices including a PDA (112), a computer workstation (104), a mobile phone (110), and personal computer (108) are connected to the WAN (101). Network-enabled mobile phone (110) connects to the WAN (101) through a wireless link (116), and the PDA (112) connects to the network (101) through a wireless link (114). In the example of FIG. 1, the personal computer (108) connects to the network (101) through a wireline connection (120), and computer workstation (104) connects to the network (101) through a wireline connection (122). In the example of FIG. 1, the laptop (126) connects to the LAN (103) through a wireless link (118) and the personal computer (102) connects to the LAN (103) through a wireline connection (124).

In the system of FIG. 1, each of the exemplary devices (108, 112, 104, 110, 126, 106, and 102) has installed upon it an operating system having a file system and a lost object search module. Each of the exemplary computers of FIG. 1 includes a computer processor and computer memory coupled for data transfer to the processor. The computer memory of each of the computers of FIG. 1 has disposed within it a file system and computer program instructions comprising a lost object search module. The lost object search module is capable generally of finding lost objects in a file system having a namespace by creating a list of all objects in the file system and iteratively carrying out the steps of identifying a portion of the namespace to compare with the list, comparing the portion of the namespace to the list, and deleting from the list all entries having names in the portion of the namespace.

The lost object search module is also capable generally of identifying the root of the namespace, identifying an object unlinked while comparing the portion of the namespace to the list, identifying objects renamed while comparing, identifying objects deleted while comparing, and identifying objects unlinked while in use ("dead") while comparing. The lost object search module is further capable generally of deleting deleted objects from the list and deleting objects unlinked while in use ("dead") from the list.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Finding lost objects in a file system having a namespace in accordance with the present invention is generally implemented with computers, that is, with automated computing machinery. In the system of FIG. 1, for example, all the nodes, servers, and communications devices are implemented to some extent at least as computers.

Figure 2:
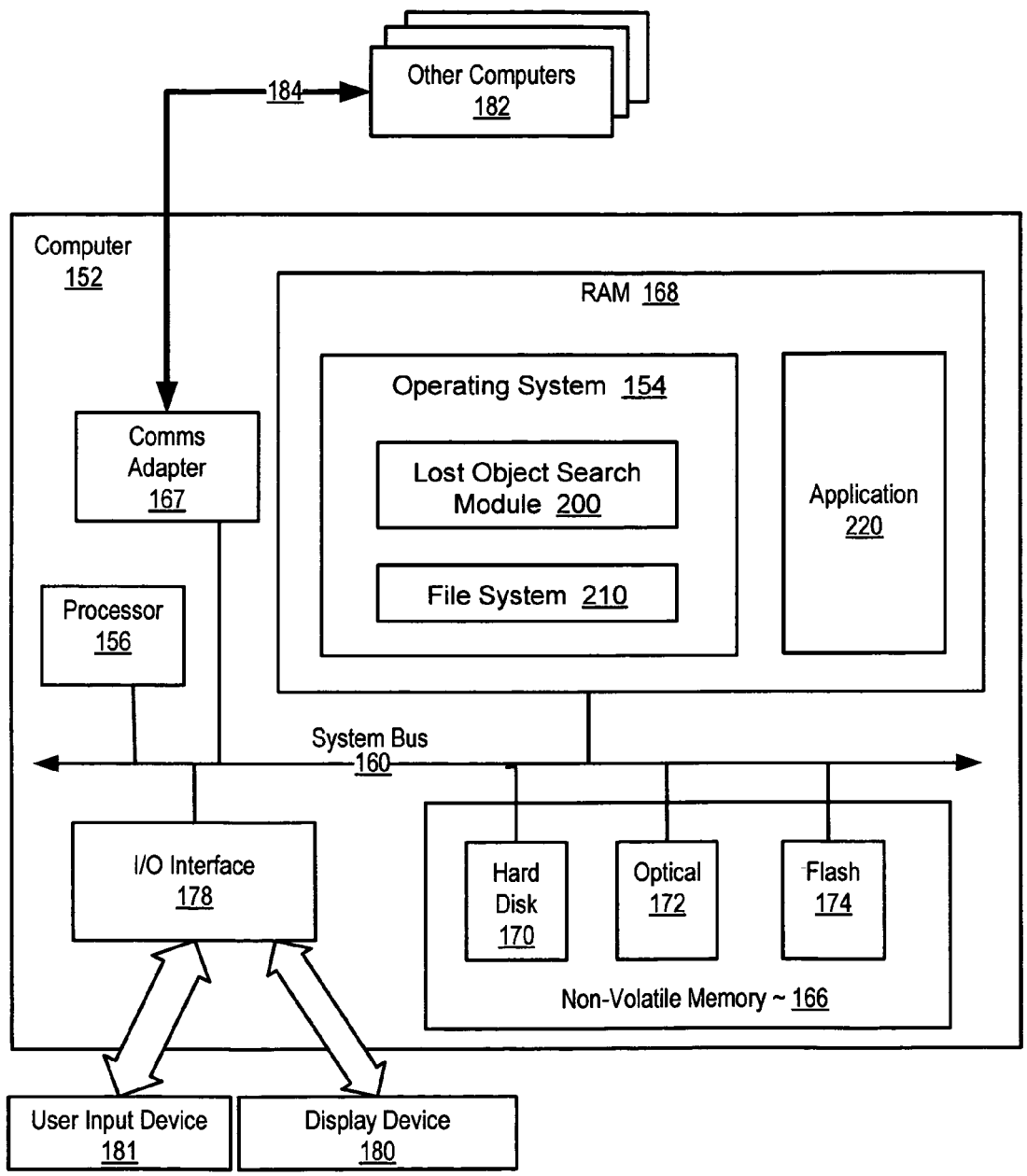
FIG. 2 sets forth a block diagram of automated computing machinery comprising an exemplary computer useful in finding lost objects in a file system having a namespace according to embodiments of the present invention.

For further explanation, therefore, FIG. 2 sets forth a block diagram of automated computing machinery comprising an exemplary computer (152) useful in finding lost objects in a file system having a namespace according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. The operating system (154) of FIG. 2 includes a file system (210). File systems provide the overall structure in which file system objects are named, stored, and organized. A file system may include files, directories, or folders, and the information needed to locate and access these items. File systems useful in computers according to embodiments of the present invention include File Allocation Table ("FAT"), High Performance File System ("HPFS"), NT Files System ("NTFS"), HFS Plus, Berkeley's Fast File System ("FFS"), Unix File System ("UFS"), second extended file system ("ext2"), Integrated File System, and others as will occur to those of skill in the art.

The operating system (154) of FIG. 2 also includes a lost object search module (200), computer program instructions for finding lost objects in a file system having a namespace according to embodiments of the present invention. Operating system (154), file system (210), application (220), and lost object search module (200) in the example of FIG. 2 are shown in RAM (168), but many components of such software typically are stored in non-volatile memory (166) also. In the example of FIG. 2, the lost object search module (200) is shown as a subsystem of the operating system (154) for explanation and not limitation. The lost object search module (200) may also be implanted as an application (220) outside the operating system (154).

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
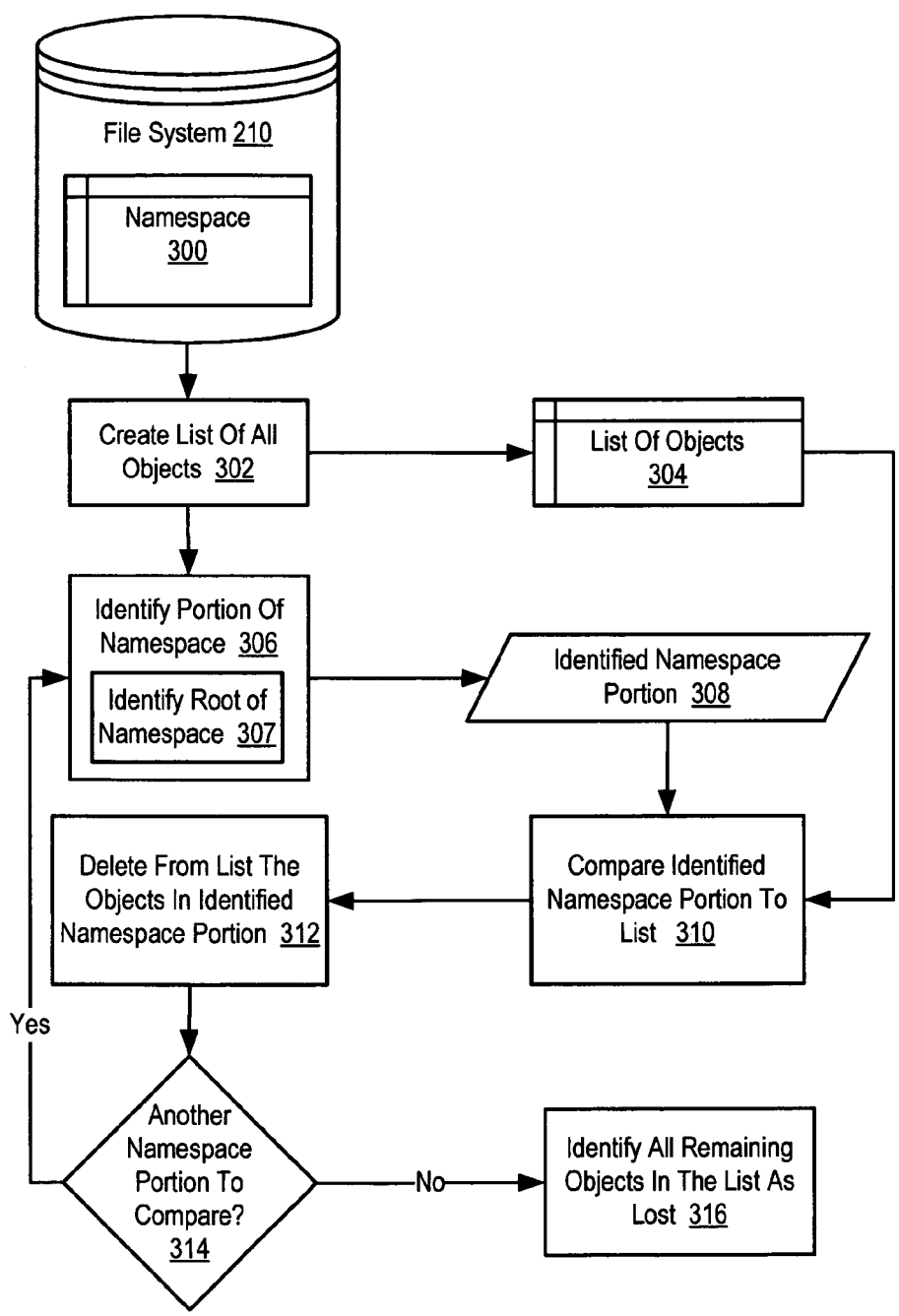
FIG. 3 sets forth a flow chart illustrating an exemplary method for finding lost objects in a file system having a namespace according to embodiments of the present invention.

For further explanation, FIG. 3 sets forth a flow chart illustrating an exemplary method for finding lost objects in a file system (210) having a namespace (300) according to embodiments of the present invention. As mentioned above, exemplary file systems (210) implemented with namespaces include FAT, NTFS, HPFS, UFS, and others as will occur to those of skill in the art. Finding lost objects in a file system (210) having a namespace (300) according to embodiments of the present invention are discussed primarily with reference to the Unix File System. This is for explanation, and not for limitation. In fact, finding lost objects in a file system (210) according to embodiments of the present invention may be carried out with many different files systems having namespaces as will occur to those of skill in the art.

File systems typically name, store, and organize objects. Typical file systems, such as for example, the Unix File System, support two main file system objects: files and directories. In the Unix File System, each object is represented by a data structure called an 'i-node.' I-nodes store information about an object such as the object's type, owner, group, mode, size, number of links, last access time, and last modification time. The i-node also contains the physical disk addresses of all the data blocks used to store the contents of the object. Every object of the file system (210) is assigned a unique i-node at the time of an object's creation. That is, one i-node exists for each file in the file system (210). All the i-nodes of a file system (210) are allocated when the file system (210) is created, and each i-node is assigned a unique 'i-number.' Because only a fixed number of i-nodes exist in a file system, the number of objects that can be created in the file system (210) is static. If all the i-nodes are used up with very tiny objects, it is possible to have a large quantity of free data blocks that simply cannot be used because no more objects can be created. However, it is much more common to run out of data blocks before running out of i-nodes.

The namespace (300) of FIG. 3 represents a collection of pathnames used to access the objects stored in the file system (210). Different file systems may represent the namespace (300) in different ways. In a FAT file system, for example, the file system creates the namespace (300) through a directory table stored as a special type of file that represents a directory. A 32 byte entry in the table identifies each file or directory stored within the directory table. Each entry records the name, extension, attributes, the date and time of creation, the address of the first cluster of the file or directory's data, and finally the size of the file or directory.

In the Unix File System, directories create the namespace (300) by providing a mapping between the names of objects and the objects themselves. By mapping the objects in the file system (210) to the namespace (300), directories impose a structure on the file system (210) as a whole. A directory can contain some number of files or other directories. The operating system maintains one special directory for each file system (210) called the 'root' directory. This directory serves as the root of the file system (210) hierarchy. Every other file or directory in the file system (210) is subordinate to the root directory. Any file in the file system (210) can be located through the namespace (300) by specifying a path through a chain of directories starting at the root. Because files are located in the namespace (300) relative to the root directory, a special case exists when the root directory is lost. When the root directory is lost, all files in the file system (210) are lost because no namespace (300) exists.

The example of FIG. 3 includes creating (302) a list (304) of all objects in the file system (210). Creating (302) a list (304) of all objects in the file system (210) according to the method of FIG. 3 may be carried out in the Unix File System by scanning the i-nodes of the file system and identifying all of the objects assigned to an i-node. Determining whether an i-node is assigned to an object in the file system (210) may be carried out by performing a bitwise AND with the value of the mode field and a predetermined constant designed to result in an indication of the type of object represented by the i-node. For example, the predetermined constant 'S_IFMT' is designed to produce the indication of a file, 'S_IFREG,' upon performing a bitwise AND with the mode field of an i-node representing a file. The predetermined constant 'S_IFMT' is included for example and not limitation. In fact, other constants may be used to perform a bitwise AND with the mode field to determine the type of object represented by the i-node as will occur to those of skill in the art.

As discussed above, each i-node is assigned a unique i-number. Creating (302) a list (304) of all objects in the file system (210) may therefore include inserting in the list the i-number assigned to each i-node that represents an object in the file system. Alternatively, creating (302) a list (304) of all objects in the file system (210) may also be carried out by storing a pointer to each i-node that is assigned to an object of the file system (210) in the list (304). Such a list (304) of stored pointers may be represented in data as an array, a linked list, a table, or any other representation in data as will occur to one skilled in the art.

The example of FIG. 3 illustrates only one file system (210). This is for explanation and not limitation. In fact, many finding lost objects according to the present invention may be implemented in environments that contain more than one file system. In such cases, creating (302) a list (304) of all objects in all the file systems may also include storing a file system ID (not shown) in association with the i-numbers or pointers to the i-nodes for a particular file system. Storing a file system ID in association with the i-numbers or pointers to the i-nodes on each file system may be useful because i-numbers and i-nodes may be unique only as to one file system.

In the method of FIG. 3, finding lost objects in a file system (210) having a namespace (300) according to embodiments of the present invention further includes identifying (306) a portion (308) of the namespace (300) to compare with the list (304) of all objects in the file system (210). Identifying (306) a portion (308) of the namespace (300) to compare with the list (304) of all objects in the file system (210) may include identifying all the pathnames of the namespace (300). Identifying all the pathnames of the namespace (300) to compare with the list (304) includes identifying (307) the root of the namespace and identifying each pathname from the root in the hierarchical namespace of the file system. Objects not accessible through the namespace, but still stored within the file system are lost objects to be found according to the method of FIG. 3.

The method of FIG. 3 continues by comparing (310) the portion (308) of the namespace (300) to the list (304) to determine whether some the file system objects in the list (304) are included in the namespace (300) and to determine whether some the file system objects in the list (304) are not included in the namespace (300). Objects in the file system (210) included in the namespace (300) are not lost and therefore can be ignored when finding lost objects in the file system (210) according to the method of FIG. 3.

As discussed above, each i-node is assigned a unique i-number. Also as discussed above, creating a namespace includes associating a pathname of an object with an i-number. The i-number for an object is the same in both its representation in the namespace and its representation as an i-node. One way of comparing (310) the portion (308) of the namespace (300) to the list (304) to determine whether some the file system objects in the list (304) are included in the namespace (300) and to determine whether some the file system objects in the list (304) are not included in the namespace (300) therefore may be carried out by comparing i-numbers associated with the i-nodes in the list (304) of all objects on the file system (210) and the i-numbers associated with object pathnames for the portion (308) of the namespace.

Because pathnames in many file systems may include special characters such as '.' or '..', such file systems provide an almost infinite number of ways to specify a single point in the namespace (300). For example, the point in the namespace (300) represented by '/RootDir/SubDir/Object' may be specified as '/RootDir/SubDir/../SubDir/Object', '/RootDir/SubDir/../SubDir/../SubDir/Object', '/RootDir/SubDir/../Sub-Dir/../SubDir/../SubDir/Object', etc. To avoid redundantly comparing (310) the same point from the portion (308) of the namespace (300) to the list (304) according to the method of FIG. 3, pathnames representing the namespace (300) do not include special pathname constructs such as '.', '..' or symbolic links.

The method of FIG. 3 also includes deleting (312) from the list (304) all entries having names in the portion (308) of the namespace (300). Deleting (312) from the list (304) all entries having names in the portion (308) of the namespace (300) may be carried out by removing the entries in the list (304) matching those in the portion (308) of the namespace of the file system.

The method of FIG. 3 further includes determining (314) whether another portion of the namespace is available to compare with the list of all objects on the file system. Objects created, deleted, renamed, or unlinked after the process of FIG. 3 begins may therefore alter the namespace because pathnames may augment or diminish the identified namespace portion (308) previously compared with the list (304) of all objects on the file system. If another portion of the namespace is available to compare with the list (304) of all objects on the file system (210), the method of FIG. 3 includes identifying (306) portion of the namespace to compare with the list (304) of all objects on the file system. The method of FIG. 3 therefore iteratively carries out the steps of identifying (306) a portion (308) of the namespace (300) to compare with the list (304), comparing (310) the portion (308) of the namespace (300) to the list (304), deleting (312) from the list (304) all entries having names in the portion (308) of the namespace (300), and determining (314) whether another portion (308) of the namespace is available to compare with the list (304) of all objects in the file system exists until all objects in the namespace have been deleted from the list (304) of all objects on the file system.

If another namespace portion to compare does not exist, then the method of FIG. 3 includes identifying (316) all remaining objects in the list (304) as lost. Lost objects have i-nodes, but lost objects are not visible in the file system (210) through the namespace (300). Once the method of FIG. 3 identifies (316) an object as lost, the object may be mapped back into the namespace (300) by creating an entry in a '/lost+found/' directory for the lost object. Creating an entry in the '/lost+found/' directory structure associates the i-number of the lost object's i-node with a pathname for the lost object. Any pathname as will occur to one skilled in the art may be used. Creating an entry in the '/lost+found/' directory provides the object visibility in the file system (210) through the namespace (300).

As mentioned above, when the root directory is lost, all objects in the file system (210) are lost because no namespace (300) exists. In order to create the namespace (300) and map the objects of the file system (210) back into the namespace (300), the kernel of the operating system must mount the root directory. Mounting the root directory may be carried out by reading the superblock of the file system. The superblock contains information about the format of the file system such as size and position of data structures for the file system (210). The superblock enables the kernel to locate the i-node representing the root directory of the file system, typically the second i-node. Once the kernel locates the i-node representing the root directory, the kernel maps the name '/' to the root directory i-node. Mapping '/' to the root directory i-node creates namespace (300). In the event that file system (210) is grafted into a second file system, mounting the root directory may also be carried out by creating an entry in the directory structure of the second file system that maps the root directory i-node for file system (210) to the namespace of the second file system. Once the root directory of file system (210) is mounted, objects in file system (210) will be visible to the extent the objects in file system (210) are not lost as mentioned above.

As mentioned above, objects in the identified namespace portion (308) often become unlinked while carryout the steps of the method for finding lost objects. Objects become unlinked, for example, when they are renamed or deleted. Objects that are deleted while they are in use, or open, are unlinked but still in use. Such unlinked but in use objects are called 'dead objects.' For further explanation, FIG. 4 sets forth a flow chart illustrating an exemplary method for finding lost objects in a file system (210) according to embodiments of the present invention wherein one or more objects are renamed during execution of the method.

Figure 4:
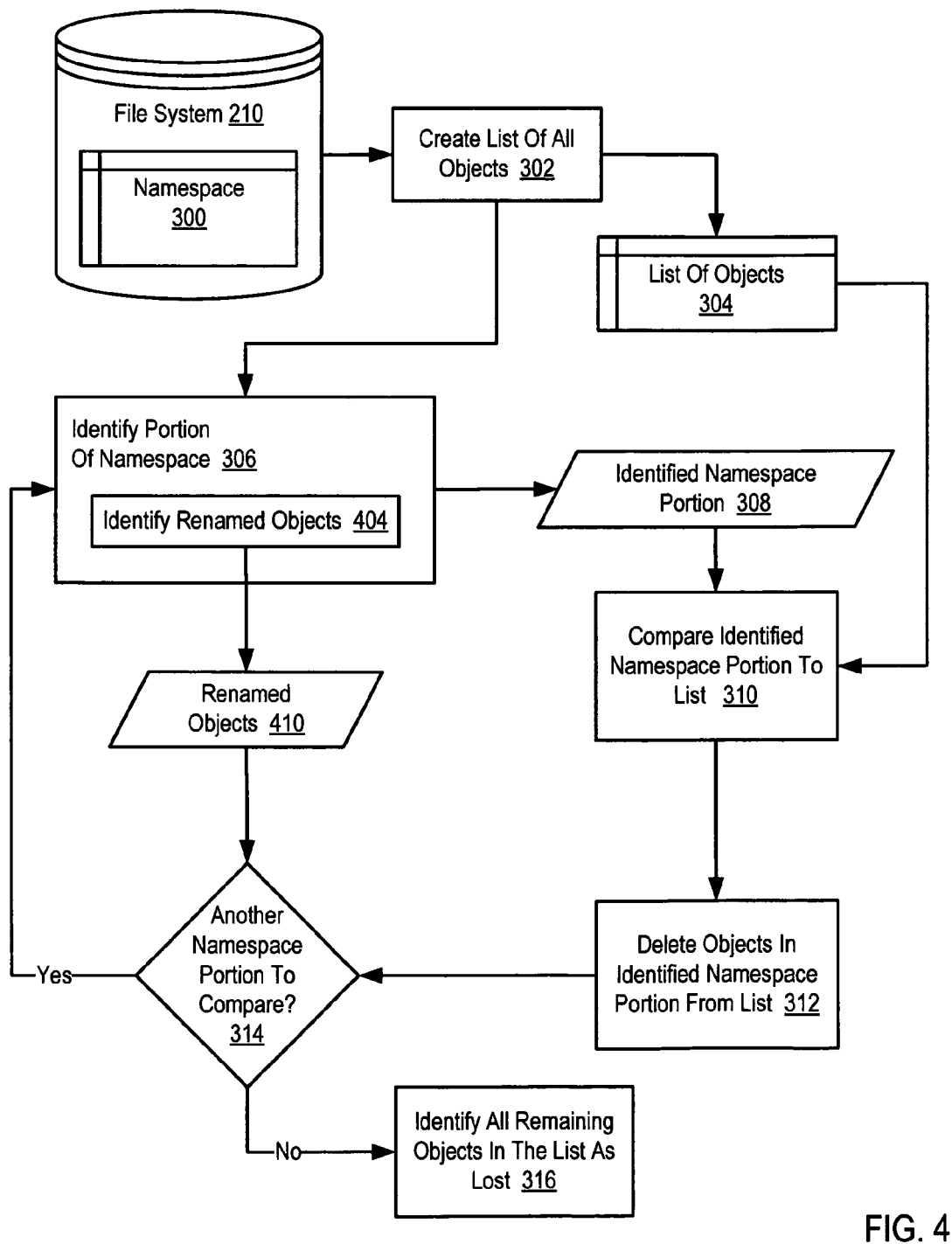
FIG. 4 sets forth a flow chart illustrating an exemplary method for finding lost objects in a file system according to embodiments of the present invention wherein one or more objects are renamed during execution of the method.

The method of FIG. 4 includes creating (302) a list (304) of all objects in the file system (210). As mentioned above with reference to FIG. 3, creating (302) a list (304) of all objects in the file system (210) according to the method of FIG. 3 may be carried out by scanning the i-nodes of the file system and identifying all of the objects assigned to an i-node and inserting in the list an i-number assigned to each identified i-node that represents an object in the file system. Alternatively, creating (302) a list (304) of all objects in the file system (210) may also be carried out by storing a pointer to each i-node that is assigned to an object of the file system (210) in the list (304).

The method of FIG. 4 also includes identifying (306) a portion (308) of the namespace (300) to compare with the list (304). As discussed above, identifying (306) a portion (308) of the namespace (300) to compare with the list (304) may include identifying pathnames of the namespace (300) to compare with the list (304) of all objects in the file system. Objects not accessible through the namespace, but still stored within the file system are lost objects to be found according to the method of FIG. 4.

In the example of FIG. 4, identifying (306) a portion (308) of the namespace (300) to compare with the list (304) includes identifying (404) objects renamed (410) during execution of the method such as an object renamed while identifying (306) a portion of the namespace or comparing (310) the portion (308) of the namespace (300) to the list (304). Renaming an object (410) changes the pathname by which the object (410) is accessed through the namespace (300). When renaming an object (410), the operating system removes the entry in the directory structure mapping the object's current pathname to the i-number corresponding to the object's i-node. The operating system then creates a new entry in the directory structure mapping the new pathname to the object's (410) i-number. Renaming an object (410) therefore remaps the object from one location in the namespace (300) to another location in the namespace (300), but does not alter the underlying object (410). If the object that is not lost is renamed to a portion of the namespace already compared with the list before it is removed from the list (304) the possibility exists that the object will not be removed from the list (304) even thought the object is not lost. For example, if the identified namespace portion (308) is '/users/' and the only area of the namespace (300) having already been compared with the list (304) is '/users/log/', then renaming a file from '/users/data/file.dat' to '/users/log/file.dat' results in the object being renamed to a portion of the name space having already been compared with the list, '/users/log/file.dat.' Such renamed objects (410) are not lost and must be removed from the list (304) as discussed below. Identifying the new pathname in another iteration of the method of FIG. 4 by identifying (404) the renamed object for comparison with the list advantageously provides a vehicle for removing the renamed object that is in fact not lost.

In the method of FIG. 4, identifying (404) objects renamed (410) during the execution of may be carried out by creating a copy of the identified namespace portion (308) before each iteration of the method of FIG. 4. A copy of the identified namespace portion (308) may be represented in data as a table that includes the pathname and i-number for each object in the identified namespace portion (308). In FIG. 4, identifying (404) objects renamed (410) during the execution of may further include comparing the copy of the identified namespace portion (308) to the currently identified namespace portion including the renamed object. Changes in the pathname for any i-number indicate that an object was renamed.

The example of FIG. 4 further includes comparing (310) the portion (308) of the namespace (300) to the list (304) and deleting (312) from the list (304) all entries having names in the portion (308) of the namespace (300) as discussed in more detail above with reference to FIG. 3. As with the method of FIG. 3, the method of FIG. 4 iteratively carries out the steps of identifying (306) a portion (308) of the namespace (300) to compare with the list (304), comparing (310) the portion (308) of the namespace (300) to the list (304), deleting (312) from the list (304) all entries having names in the portion (308) of the namespace (300), and determining (314) whether another namespace (308) to compare exists.

If another namespace portion (308) to compare does not exist, then the method of FIG. 4 continues with identifying (316) all remaining objects in the list (304) as lost. As mentioned above, lost objects have i-nodes, but lost objects are not visible in the file system (210) through the namespace (300). Once the method of FIG. 4 identifies (316) an object as lost, the object may be mapped back into the namespace (300).

As mentioned above, objects in the identified namespace portion (308) often become unlinked during execution of the method. Such objects may become unlinked when the object is deleted during the execution of the method for finding lost objects. For further explanation, FIG. 5 sets forth a flow chart illustrating an exemplary method according to embodiments of the present invention for finding lost objects in a file system (210) having a namespace (300) that includes identifying deleted objects during execution of the method. The method of FIG. 5 includes creating (302) a list (304) of all objects in the file system (210). As mentioned above with reference to FIG. 3, creating (302) a list (304) of all objects in the file system (210) according to the method of FIG. 3 may be carried out by scanning the i-nodes of the file system and identifying all of the objects assigned to an i-node and inserting in the list an i-number assigned to each identified i-node that represents an object in the file system. Alternatively, creating (302) a list (304) of all objects in the file system (210) may also be carried out by storing a pointer to each i-node that is assigned to an object of the file system (210) in the list (304).

Figure 5:
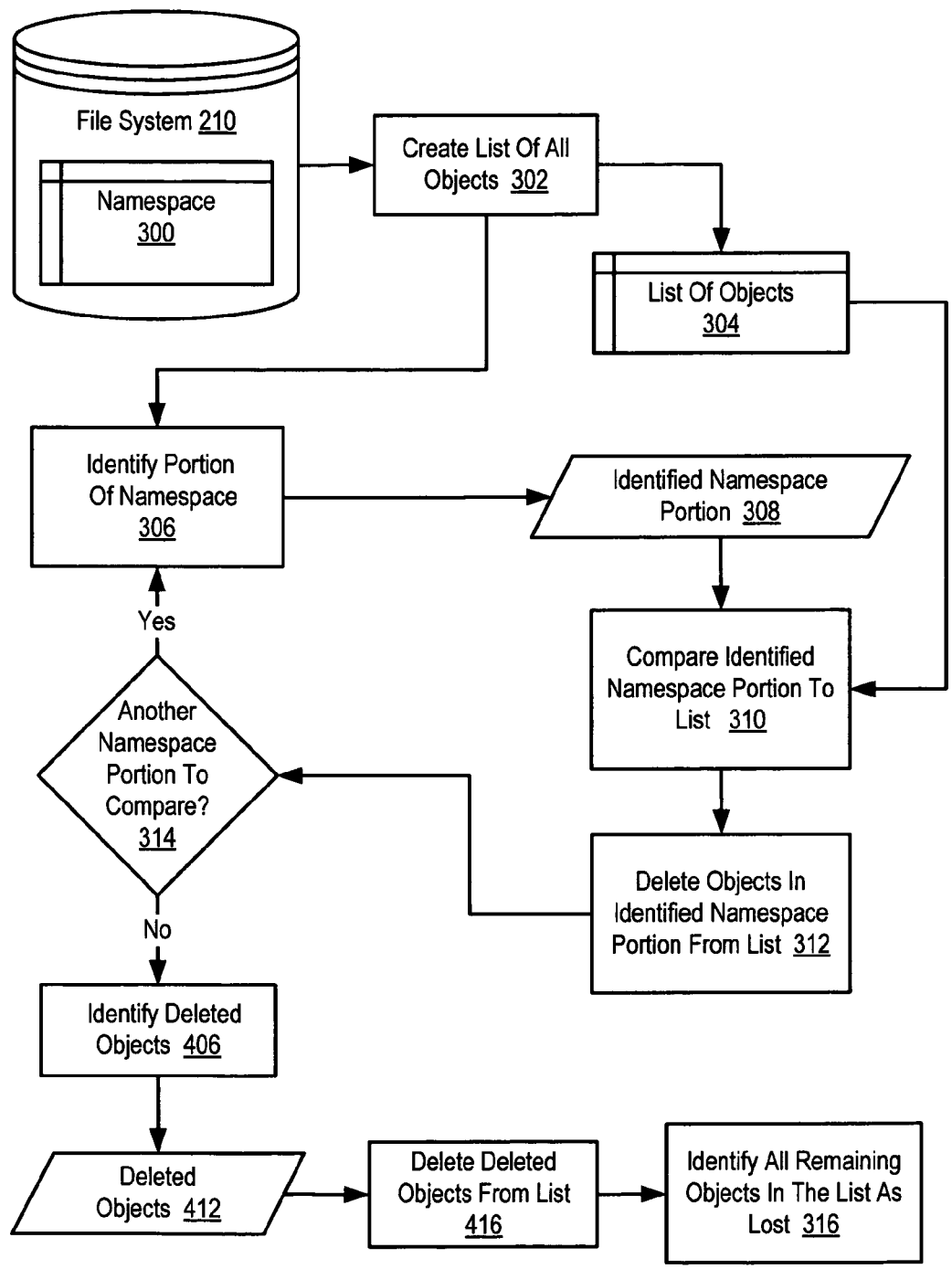
FIG. 5 sets forth a flow chart illustrating an exemplary method according to embodiments of the present invention for finding lost objects in a file system having a namespace that includes identifying deleted objects during execution of the method.

The method of FIG. 5 includes identifying (306) a portion (308) of the namespace (300) to compare with the list (304), comparing (310) the portion (308) of the namespace (300) to the list (304) and deleting (312) from the list (304) all entries having names in the portion (308) of the namespace (300) as discussed above in more detail with reference to FIG. 3. As with the method of FIG. 3, the method of FIG. 5 iteratively carries out the steps of identifying (306) a portion (308) of the namespace (300) to compare with the list (304), comparing (310) the portion (308) of the namespace (300) to the list (304), deleting (312) from the list (304) all entries having names in the portion (308) of the namespace (300), and determining (314) whether another namespace to compare exists.

Objects that are deleted during execution of the method are not retained in the visible name space and therefore are not identified by iteratively identifying a portion of the name space to compare with the list. Such deleted objects are also however not lost because they are no longer objects in the file system. The method of FIG. 5 therefore includes identifying (406) deleted objects (412) during execution of the method and deleting (416) the identified deleted objects (412) from the list (304). Deleting an object (412) removes the object from the namespace (300) and frees the physical storage allocated by the file system (210) to the object. In a Unix File System, for example, deleting an object (412) removes the pathname and i-number from the directory structure and decrements the 'link' field of the object's i-node. The 'link' field of the i-node indicates how many times the object occurs in the directory structure using different pathnames. That is, the 'link' field indicates how many maps exist between the namespace (300) and the object of the file system (210). Once the 'link' field of an i-node decrements to zero, the object no longer exists in the namespace (300) and the operating system frees up the physical storage allocated to the object (412) by setting the 'mode' field of the i-node to zero. Deleted objects (412) are not lost and must be removed from the list (304) as discussed below.

Identifying (406) objects deleted (412) during execution of the method may be carried out by creating a copy of the identified namespace portion (308) with each iteration of the method of FIG. 5 and comparing a copy of the identified namespace portion before an iteration with a copy of the identified namespace portion after an iteration to identify an i-number occurring in the copy of the identified namespace portion before the iteration and not found in the copy of the identified namespace portion after the iteration.

Deleting (416) the identified deleted objects (412) from the list (304) in the method of FIG. 5 for finding lost objects may be carried out by removing from the list (304) the i-numbers or pointers to the i-nodes associated with the identified deleted objects (412).

The method of FIG. 5 includes identifying (316) all remaining objects in the list (304) as lost. As mentioned above, lost objects have i-nodes, but lost objects are not visible in the file system (210) through the namespace (300). Once the method of FIG. 5 identifies (316) an object as lost, the object may be mapped back into the namespace (300).

As mentioned above, objects in the identified namespace portion (308) often become unlinked during execution of the method. Such objects may become unlinked when the object is deleted while the object is in use and during the execution of the method for finding lost objects. Such objects are called 'dead objects.' For further explanation, FIG. 6 sets forth a flow chart illustrating an exemplary method according to embodiments of the present invention for finding lost objects in a file system (210) having a namespace (300) that includes identifying objects unlinked while in use and while the list (304) of all objects exists.

Figure 6:
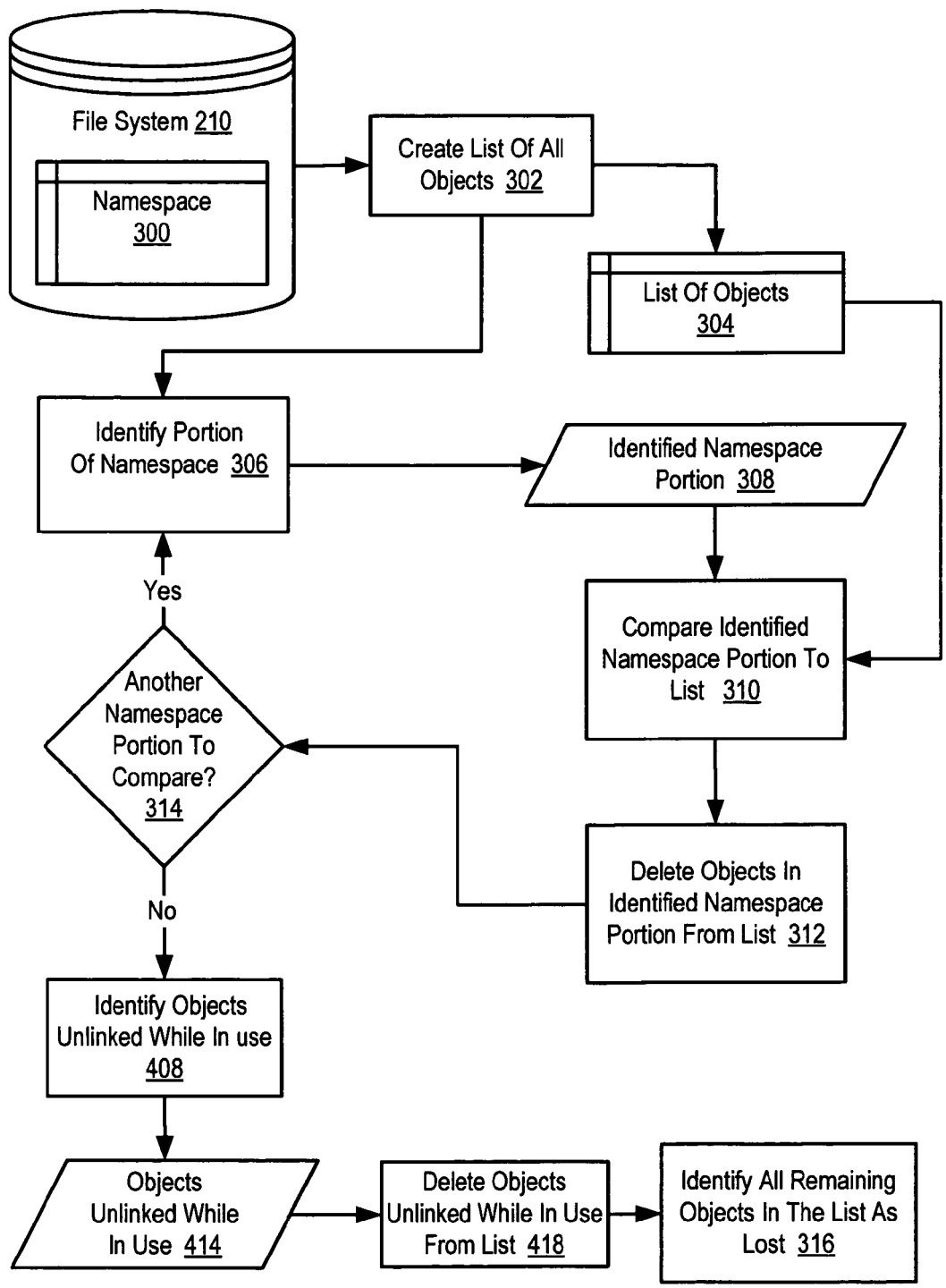
FIG. 6 sets forth a flow chart illustrating an exemplary method according to embodiments of the present invention for finding lost objects in a file system having a namespace that includes identifying objects unlinked while in use and while the list of all objects exists.

The method of FIG. 6 includes creating (302) a list (304) of all objects in the file system (210). As mentioned above with reference to FIG. 3, creating (302) a list (304) of all objects in the file system (210) according to the method of FIG. 3 may be carried out by scanning the i-nodes of the file system and identifying all of the objects assigned to an i-node and inserting in the list an i-number assigned to each identified i-node that represents an object in the file system. Alternatively, creating (302) a list (304) of all objects in the file system (210) may also be carried out by storing a pointer to each i-node that is assigned to an object of the file system (210) in the list (304).

The method of FIG. 6 includes identifying (306) a portion (308) of the namespace (300) to compare with the list (304), comparing (310) the portion (308) of the namespace (300) to the list (304) and deleting (312) from the list (304) all entries having names in the portion (308) of the namespace (300) as discussed above in more detail with reference to FIG. 3. As with the method of FIG. 3, the method of FIG. 6 iteratively carries out the steps of identifying (306) a portion (308) of the namespace (300) to compare with the list (304), comparing (310) the portion (308) of the namespace (300) to the list (304), deleting (312) from the list (304) all entries having names in the portion (308) of the namespace (300), and determining (314) whether another namespace to compare exists.

Objects that are unlinked while in use during execution of the method are not retained in the visible name space and therefore are not identified by iteratively identifying a portion of the name space to compare with the list. Such dead objects are also however not lost because they are no longer objects in the file system because they will be deleted by the operating system once the object is closed. The method of FIG. 6 therefore includes identifying (408) objects (414) unlinked while in use during execution of the method and deleting (418) the identified objects (414) unlinked while in use from the list (304). Objects (414) unlinked while in use occur when an application or operating system removes an object from the namespace (300) while the object remains in use by an application or operating system. Such dead objects (414) remain accessible to the application or operating system though the dead objects (414) are not visible through the namespace (300) of the file system (210). When the application or operating system closes the dead object (414), the operating system deletes the dead object (414). In the Unix File System, the 'link' field of an i-node with one pathname in the directory structure is set to '1.' When an application or operating system opens an object for use, the 'use count' field of the object's i-node is incremented and a pointer to the object's i-node is placed in the UFS open files table. An object with one entry in the directory structure and opened by one application will have a value of '1' in both the 'link' and 'use count' field. If another application deletes the object's pathname from the directory structure, thereby removing the object from the namespace (300), the 'link' field decreases to '0' while the object remains in use by the first application with a 'use count' equal to 1. The object is no longer accessible through the namespace (300). The object is now a dead object (414) because the operating system will delete the dead object (414) when the object's 'use count' field decreases to zero upon removal of the dead object (414) from the USF open files table. Dead objects (414) are not lost and must be removed from the list (304) as discussed below.

Identifying (408) objects unlinked during execution of the method according the method of FIG. 6 may be carried out by scanning an open files list and if the value of the link field is equal to the frequency the object appears in the open files list, then the object is identified as dead.

Deleting (418) the identified objects (414) unlinked while in use from the list (304) during execution of the method according to the method of FIG. 6 for finding lost objects may be carried out by removing from the list (304) the i-numbers or pointers to the i-nodes associated with the identified objects (414) unlinked while in use.

The method of FIG. 6 includes identifying (316) all remaining objects in the list (304) as lost. As mentioned above, lost objects have i-nodes, but lost objects are not visible in the file system (210) through the namespace (300). Once the method of FIG. 6 identifies (316) an object as lost, the object may be mapped back into the namespace (300).

Exemplary embodiments of the present invention are described largely in the context of a fully functional computer system for finding lost objects in a file system having a namespace. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for finding lost objects in a file system, the file system having a namespace, the computer comprising a computer processor, a computer memory operatively coupled to the computer processor, the computer memory having disposed within it computer program instructions that execute steps of the method, the method comprising:
creating a list of all objects in the file system;
identifying a portion of the namespace to compare with the list;
comparing the portion of the namespace to the list;
deleting from the list entries for objects represented in the portion of the namespace; and
identifying objects unlinked while in use during execution of the method and deleting the identified objects unlinked while in use from the list.

2. The method of claim 1 further comprising determining whether another portion of the namespace is available to compare with the list of all objects in the file system.

3. The method of claim 1 wherein identifying a portion of the namespace to compare with the list further comprises identifying the root of the namespace.

4. The method of claim 1 wherein identifying a portion of the namespace to compare with the list further comprises identifying objects renamed during execution of the method.

5. The method of claim 1 further comprising identifying deleted objects during execution of the method and deleting the identified deleted objects from the list.

6. An apparatus for finding lost objects in a file system, the file system having a namespace, the apparatus comprising:
a computer processor;
a computer memory operatively coupled to the computer processor, the computer memory having disposed within it computer program instructions that when executed by the computer processor cause the apparatus to carry out the steps of:
creating a list of all objects in the file system;
identifying a portion of the namespace to compare with the list;
comparing the portion of the namespace to the list;
deleting from the list entries for objects represented in the portion of the namespace; and
identifying objects unlinked while in use during execution of the method and deleting the identified objects unlinked while in use from the list.

7. The apparatus of claim 6 wherein the computer memory also has disposed within it computer program instructions that when executed by the computer processor cause the apparatus to carry out the steps of:
determining whether another portion of the namespace is available to compare with the list of all objects in the file system.

8. The apparatus of claim 6 wherein the computer program instructions that when executed by the computer processor cause the apparatus to carry out the steps of identifying a portion of the namespace to compare with the list further comprises computer program instructions that when executed by the computer processor cause the apparatus to carry out the steps of:
identifying the root of the namespace.

9. The apparatus of claim 6 wherein the computer program instructions that when executed by the computer processor cause the apparatus to carry out the steps of identifying a portion of the namespace to compare with the list further comprises computer program instructions that when executed by the computer processor cause the apparatus to carry out the steps of identifying objects renamed during execution of the computer program instructions.

10. The apparatus of claim 6 wherein the computer memory also has disposed within it computer program instructions that when executed by the computer processor cause the apparatus to carry out the steps of identifying deleted objects during execution of the computer program instructions and deleting the identified deleted objects from the list.

11. A computer program product for finding lost objects in a file system, the file system having a namespace, the computer program product disposed upon a non-transitory computer-readable recording medium, the computer program product comprising:
computer program instructions that create a list of all objects in the file system;
computer program instructions that identify a portion of the namespace to compare with the list;
computer program instructions that compare the portion of the namespace to the list;
computer program instructions that delete from the list entries for objects represented in the portion of the namespace; and
computer program instructions that identify objects unlinked while in use during execution of the method and deleting the identified objects unlinked while in use from the list.

12. The computer program product of claim 11 further comprising computer program instructions that determine whether another portion of the namespace is available to compare with the list of all objects in the file system.

13. The computer program product of claim 11 wherein the computer program instructions that identify a portion of the namespace to compare with the list further comprise computer program instructions that identify the root of the namespace.

14. The computer program product of claim 11 wherein the computer program instructions that identify a portion of the namespace to compare with the list further comprise computer program instructions that identify objects renamed during execution of the computer program instructions.

15. The computer program product of claim 11 further comprising computer program instructions that identify deleted objects during execution of the computer program instructions and computer program instructions that delete the identified deleted objects from the list.

* * * * *